US006348566B1

(12) United States Patent
Sarasto

(10) Patent No.: US 6,348,566 B1
(45) Date of Patent: Feb. 19, 2002

(54) METHOD FOR PREPARING TALL OIL

(75) Inventor: Seppo Sarasto, Oulu (FI)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/581,144

(22) PCT Filed: Dec. 10, 1998

(86) PCT No.: PCT/FI98/00958

§ 371 Date: Sep. 26, 2000

§ 102(e) Date: Sep. 26, 2000

(87) PCT Pub. No.: WO99/29813

PCT Pub. Date: Jun. 17, 1999

(30) Foreign Application Priority Data

Dec. 11, 1997 (FI) .................................. 974489

(51) Int. Cl.⁷ .............................. C11B 13/00
(52) U.S. Cl. ................... 530/205; 530/206; 530/208
(58) Field of Search ............... 530/205, 206, 530/208

(56) References Cited

U.S. PATENT DOCUMENTS

| 3,901,869 A | 8/1975 | Bills |
| 4,495,095 A | 1/1985 | Lawson et al. |
| 5,565,134 A | * 10/1996 | Tanner et al. ............... 530/220 |

FOREIGN PATENT DOCUMENTS

| FI | 95595 | 3/1994 |
| FI | 952176 | 5/1995 |
| WO | WO 93/23132 | 11/1993 |
| WO | WO 94/11571 | 5/1994 |
| WO | WO 95/23837 | 9/1995 |
| WO | WO 96/34932 | 11/1996 |

* cited by examiner

*Primary Examiner*—Nathan M. Nutter
(74) *Attorney, Agent, or Firm*—Burns, Doane, Swecker & Mathis, L.L.P.

(57) ABSTRACT

The invention relates to a method for enhancing the cooking step in a tall oil preparation process comprising:

a neutralization step in which soap is neutralied to form soap oil, and a cooking step in which soap oil is cooked with sulphuric acid to form tall oil, the soap oil obtained in the neutralization step being subjected to an intermediate treatment before the cooking step, the intermediate treatment comprising heating of the soap oil to release gases dissolved in and bound to the soap oil.

The invention also relates to a method for preparing tall oil comprising the steps mentioned above.

24 Claims, 2 Drawing Sheets

METHOD FOR PREPARING TALL OIL

BACKGROUND OF THE INVENTION

1. Field of the Invention

This invention relates to a method for enhancing the cooking step in a tall oil preparation process comprising a neutralisation step, in which soap is neutralised to form soap oil, and a cooking step, in which soap oil is cooked with sulphuric acid to form tall oil. The invention also relates to a method for preparing tall oil comprising the steps above.

2. Description of the Related Art

In the alkaline digestion of softwood or hardwood, especially in the sulphate method, "black liquor" is formed, which contains crude tall oil soap, called crude soap below. This crude soap can be decomposed by means of sulphuric acid to form crude tall oil.

U.S. Pat. No. 3,901,869 discloses a process for preparing tall oil based on carbon dioxide neutralisation. In the first step of this known process, crude soap is neutralised with carbon dioxide and after this step water is separated and finally tall oil cook is performed by means of sulphuric acid. When crude tall oil is treated with carbon dioxide, carbon dioxide dissolves in the soap/water emulsion and the carbon oxide formed neutralises soap and the lye accompanying it. The pH of the soap/water mixture can be decreased to the range 7.5–8.2 by neutralisation. This known method involves the drawback of poor water separation. Poor water separation results in excess consumption of sulphuric acid in the subsequent cook, and the water surplus expands the process cycles unnecessarily. A surplus of water containing $CO_2$ also entails effervescence in the sulphuric acid cook, because bicarbonate decomposes when cooked.

WO Patent Application 94/11571 discloses a method for preparing tall oil by first performing preoxidation with a sodium bisulphate solution, followed by a tall oil cook with sulphuric acid.

FI Patent Application 940969 describes a method, in which carbon dioxide neutralisation is followed by a second neutralisation by means of an $H_2SO_4$ addition. With this procedure, soap separation in the water separation step was improved compared to a method where no intermediate neutralisation with sulphuric acid was performed. After this intermediate neutralisation, a tall oil cook is performed by means of sulphuric acid.

FI Patent Application 952176 discloses a similar method, in which the sulphuric acid used for intermediate neutralisation is replaced with an acidly reacting substance containing bisulphite.

SUMMARY OF THE INVENTION

The purpose of the invention is to further improve the tall oil preparation process, particularly the cooking step of the process.

The chief characteristics of the invention are defined in the accompanying claims.

Thus, the invention provides a method for enhancing the cooking step in a tall oil preparation process comprising:

a neutralisation step, in which soap is neutralised to form soap oil, and a cooking step, in which soap oil is cooked with sulphuric acid to form tall oil, the method being characterised by the fact that the soap oil obtained in the neutralisation step is subjected to an intermediate treatment before the cooking step, the intermediate treatment comprising heating the soap oil in order to release gases dissolved in and bound to the soap oil.

In addition, the invention provides a method for preparing tall oil comprising:

a neutralisation step, in which soap is neutralised to form soap oil, and a cooking step, in which soap oil is cooked with sulphuric acid to form tall oil, the method being characterised by the fact that it also comprises an intermediate treatment, in which the soap oil obtained in the neutralisation step is heated before the cooking step in order to release gases dissolved in and bound to the soap oil, thereby facilitating the cook and enhancing the phase separation following the cook.

Owing to the intermediate treatment of the invention, soap oil is easier to cook, i.e. the final cook requires less sulphuric acid and/or shorter cooking periods, and the phase separation following the cook is rapid.

The intermediate treatment mentioned above is a separate step between the neutralisation step and the cooking step, and no chemicals are added in this step. The intermediate treatment can be performed in a separate reactor, but it is also possible to perform the intermediate treatment and the cooking step consecutively in the same reactor.

The intermediate treatment is preferably performed at a temperature in the approximate range from 60 to 100° C., and most preferably at a temperature in the approximate range from 90 to 98° C. The intermediate treatment duration is preferably 5 minutes or more, and most preferably approximately 5 to 30 minutes.

The neutralisation step in accordance with the invention may comprise neutralisation of soap with an acidly reacting substance, which is preferably carbon dioxide, bisulphite, sulphur dioxide or carboxylic acid, or a mixture of these.

The neutralisation step of the invention may also comprise soap neutralisation first with carbon dioxide and then with a second acidly reacting substance, which is preferably bisulphite, sulphur dioxide, sulphuric acid, hydrochloric acid, nitric acid or carboxylic acid, or a combination of these.

The carboxylic acid mentioned above may be for instance formic acid.

The bisulphite used for neutralisation may consist of a residual solution produced in the additional scrubbing of sulphurous flue gases from a pulp mill, the solution containing sodium sulphite ($Na_2SO_3$) besides sodium bisulphite ($NaHSO_3$).

The neutralisation step preferably comprises neutralisation with carbon dioxide. $CO_2$ neutralisation can be performed under normal pressure or over-pressure, typically under a pressure of about 8 bar. The carbon dioxide used is preferably a carbon dioxide gas.

The intermediate treatment is preferably conducted under atmospheric pressure, however, higher or lower pressures can also be applied.

In this invention, the term "soap oil" denotes crude soap pre-neutralised with carbon dioxide or some other acid chemical.

BRIEF DESCRIPTION OF THE FIGURES OF THE DRAWING

The invention is described in greater detail below with reference to the accompanying drawings, of which

DETAILED DESCRIPTION OF THE PREFERRED EMBODIMENTS

Figure 1:
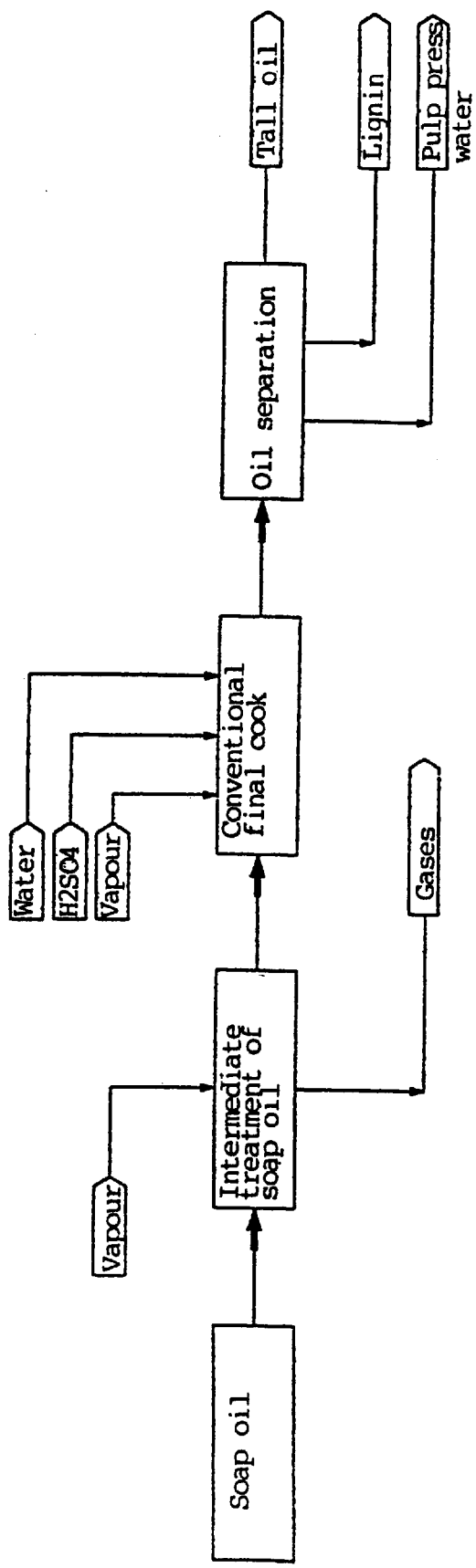
FIG. 1 is a block diagram of a tall oil preparation process in accordance with the invention.

In FIG. 1, soap oil, which is crude soap pre-neutralised with carbon dioxide or some other acid chemical, is introduced in the intermediate tall oil treatment step. In a preferred embodiment, this intermediate step can be performed as follows:

Soap oil is fed into a heat exchanger or a direct steam heater, in which the temperature of the soap oil is raised to the temperature range from 60 to 100° C. The temperature may be even higher than this, especially if pressures higher than the atmospheric pressure are applied. The temperature may for instance equal the boiling point of the mixture. Soap oil contains physical and chemical $CO_2$ gas bonds of an organic substance, the bonds breaking up during heating, so that gases are released. Besides carbon dioxide, also other gases are released during heating.

The heated flow of soap oil and gas is conducted to a gas separation vessel, where the gases are separated from the soap oil and the reactions end. The major portion of the gases is released during 5 minutes, the mixture being highly effervescent. The temperature of the gas separation vessel is kept at 60 to 100° C. The temperature of the vessel may equal the boiling point of the mixture, which depends on the pressure. Normally atmospheric pressure prevails in the vessel. The pressure may also be higher or lower than the atmospheric pressure. The retention time of tall oil in the gas separation vessel is normally 10 minutes, but may also be shorter or longer depending on the temperature applied. The vessel is equipped with a heating coil, but heating may also be performed with direct steam. The gas separation vessel comprises a mixer, which enhances gas separation and breaks the foam bed.

After the intermediate soap oil treatment, soap oil is introduced in a conventional tall oil cooker, where conventional final cook of the tall oil is performed with sulphuric acid. From this conventional final cook, the product is conducted to oil separation, where tall oil is separated from lignin and pulp press water.

In accordance with the invention, soap oil which has been subjected to intermediate treatment is more readily digested in the final cook, the temperature required for the cook being easier to reach as the production of gases cooling the mixture is reduced. The lignin/pulp press phase is also different from that of digestion without an intermediate treatment. The oil is more rapidly separated in the tall oil separation step than in a process without an intermediate step.

The invention is further described below with the aid of examples.

EXAMPLES

In the following examples, soap oil was prepared by pre-neutralising crude soap with carbon dioxide as follows:

Crude soap (pH about 13) is pumped into a neutralising reactor, preceded by water addition to the soap flow. The reactor is supplied with carbon dioxide, which is dispersed into the soap/water emulsion with a mixer, thus reacting with the water forming carbon oxide, and is then mixed as carbon dioxide with crude soap under a pressure of approx. 8 bar.

The reaction product (pH of about 8) flows into the gas separation reactor, from which the inert gases are removed.

From the gas separation rector, the mixture flows into static mixers, preceded by sulphuric acid addition to enhance the separation of pulp press water and soap oil (a final pH of approx. 7) (intermediate neutralisation).

After the mixers the mixture of soap oil and pulp press water is conducted to a separation vessel, where two phases are formed, with soap oil on the surface and pulp press water at the bottom.

The soap oil is stripped from the surface of the separation vessel and is pumped forward in the process.

Crude soap processed as described above is called soap oil.

The next comparative example 1 represents conventional techniques, whereas examples 1 to 5 represent the procedure of the invention. In the examples, the tall oil separation was determined by measuring the amount of tall oil (ml) as a function of time (min.). The results are shown in accompanying FIG. 2.

In all of the examples, the cooking reactor was a 1,000 ml decanter vessel equipped with a mixer. The vessel was heated on an electric hotplate and the temperature of the soap oil was adjusted by means of a contact thermometer. The tall oil separation was determined using a 1 litre gauge glass. The quality of the tall oil separated in all of the tests was good.

Comparative example 1

Figure 2:
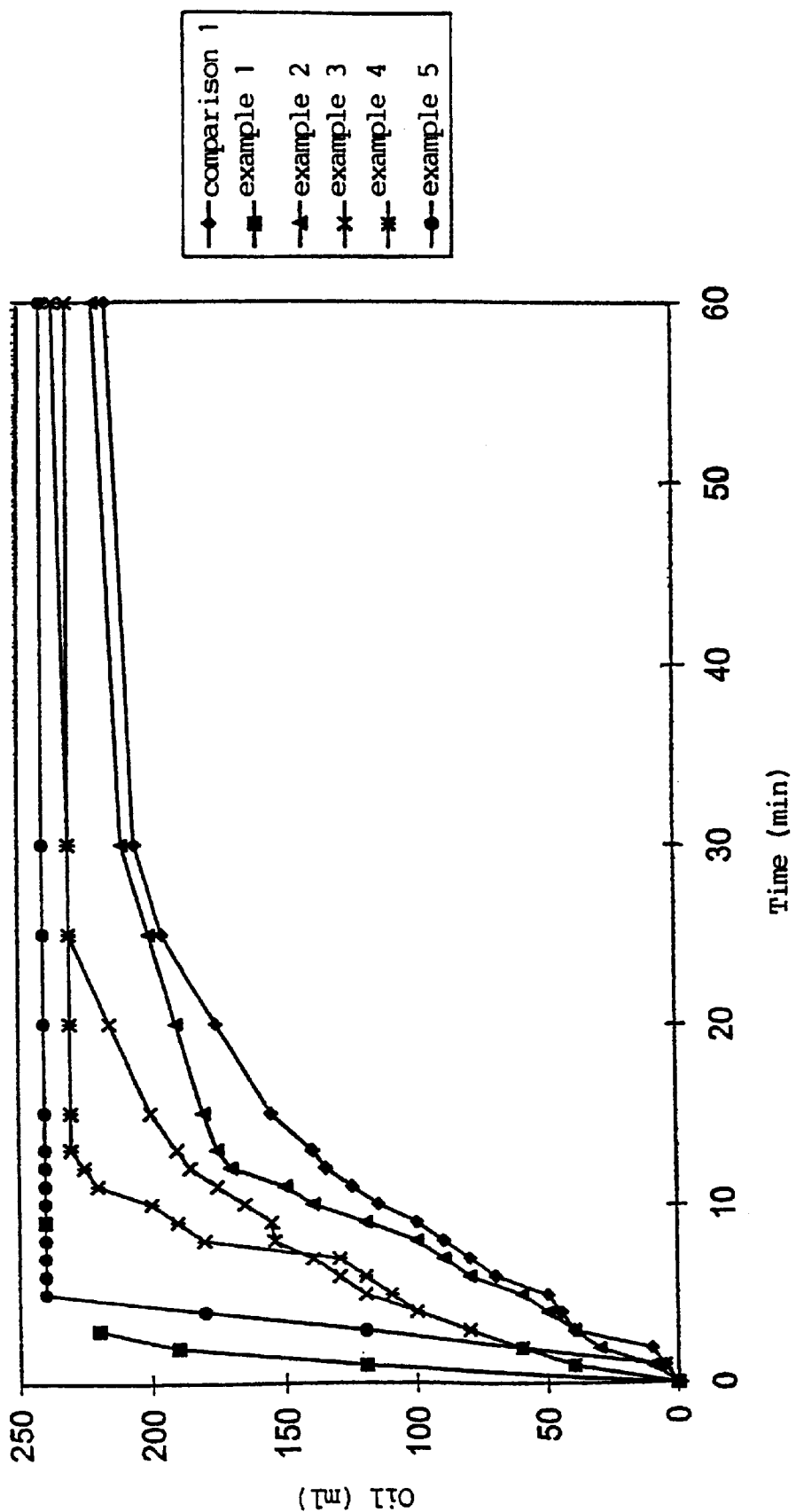
FIG. 2 is a graphic chart of comparative test results.

500 g of soap oil was weighed and 50 g of water ws added to this. The mixture of soap oil and water was heated to a temperature of 80° C. and 30 g (95 to 97%) of sulphuric acid was added. The acidified mixture was cooked for 30 minutes at a temperature of 100° C. during constant stirring at a rate of about 100 rpm. After the cook, the mixture was poured into a gauge glass. The tall oil separation that was determined is shown in FIG. 2.

Example 1

500 g of soap oil was weighed and 50 g of water was added to this. The mixture of soap oil and water was subjected to intermediate treatment at a temperature from 90 to 95° C. for 10 minutes while the mixture was stirred. After this, 30 g (95 to 97%) of sulphuric acid was added. The sulphuric acid addition was performed for 5 seconds. The final cook took 10 minutes in all, and then the mixture was poured into a gauge glass.

Example 2

In this example, no water was added to the soap oil (nor was it added in examples 3 to 5). Before the actual cooking to form oil, the soap oil was subjected to an intermediate treatment for 20 minutes at a temperature of 80° C. while stirring. In the intermediate treatment step, gas/soap oil foam was produced in abundance, starting at as low a temperature as approx. 60° C. After the intermediate treatment step, 30 g of sulphuric acid was added to the mixture and the mixture was cooked for 30 minutes at a temperature of 100° C. while stirring. Then the mixture was poured into a gauge glas. The analysis of the separated tall oil was: 0.9% of $H_2O$, acid number 155, soap number 0.0 and pH 3.6.

Example 3

In this example, the temperature of the intermediate treatment step was 90° C. and it lasted 20 minutes. After this 30 g of sulphuric acid was added to the mixture and the mixture was first stirred rapidly (about 100 rpm) and then slower (30 rpm). The temperature of the mixture was 101–97° C. in the cooking step. After this the mixture was transferred into a gauge glass. The oil was separated fairly rapidly. The analysis of the separated tall oil was: 1.1% of $H_2O$, acid number 150, soap number 0.0 and pH 3.4.

Example 4

The purpose of this example was to optimise sulphuric acid consumption in the cook. The mixture was subjected to intermediate treatment for 30 minutes at a temperature of 90° C. After this sulphuric acid was added to adjust the pH of the mixture. The total amount of sulphuric acid addition was 25.3 g, the final pH being 3.03. Oil separation was fast in the beginning, but slowed down somewhat at the end. Yet the overall separation process was rapid in this test. The analysis of the separated tall oil was: 2.1% of $H_2O$, acid number 150, soap number 0.01 and pH 4.1.

Example 5

In this example, the intermediate treatment step was similar to that of example 4 (30 minutes, 90° C.). 25 g of sulphuric acid was added without pH monitoring to the mixture which had been subjected to intermediate treatment, the acid addition taking place faster than in example 4. The analysis of the separated tall oil was: 2.1% of $H_2O$, acid number 150, soap number 0.03 and pH 4.1.

Data on the exemplified tests are compiled in table 1. The separation curves shown in FIG. 2 lead to the conclusion that examples 1, 4 and 5 of the invention yielded the best results. The tests indicated the following optimal conditions in terms of separation: temperature $\geq$ 90° C., preferably 90 to 98° C. and precooking period $\geq$ approx. 5 minutes, preferably about 5 to 30 minutes. The rate of adding sulphuric acid also affects separability in such a way that rapid addition promotes oil separation.

TABLE 1

Summary of the tests

| Example | Soap oil, g | Water, g | Intermed. treatm. temp. °C. | Interm. treatm. duration min. | Amount of sulph. acid g (95–97%) | N.B. |
| --- | --- | --- | --- | --- | --- | --- |
| Comp. 1 | 500 | 50 | — | — | 30 | Comparative test |
| 1 | 500 | 50 | 90–95 | 10 | 30 | Rapid $H_2SO_4$ addition |
| 2 | 500 | — | 80 | 20 | 30 | |
| 3 | 500 | — | 90 | 20 | 30 | |
| 4 | 500 | — | 90 | 30 | 25.3 | |
| 5 | 500 | — | 90 | 30 | 25 | Rapid $H_2SO_4$ addition |

A separate test aimed to settle the amount and composition of gas released from the soap oil. To this end, soap oil (638.2 g) was heated in a closed glass reactor at a temperature of 90° C. The gas released in the reactor gas space was collected into a sample bag for one hour. The volume of collected dry gas was 540 ml. It had the following analysis:

| $H_2$ | <0.1 | % by volume |
| --- | --- | --- |
| $O_2 + Ar$ | 4.6 | % by volume |
| $CH_4$ | <0.05 | % by volume |
| CO | <0.05 | % by volume |
| $CO_2$ | 73.2 | % by volume |
| $H_2S$ | approx. 1,400 | ppm |
| $SO_2$ | approx. 2 | ppm |
| $N_2$ | remainder | |

The $CO_2$ concentration of the soap oil was also determined before and after the intermediate treatment. The concentration was 0.42% before the intermediate treatment and 0.16% after the intermediate treatment.

Tests have also proved that the use of the method of the invention reduces the amount of acid required in the final cook.

What is claimed is:

1. A method for enhancing the cooking step in a tall oil preparation process comprising:
a neutralisation step, in which the soap is neutralised to form soap oil, and a cooking step, in which the soap oil is cooked with sulphuric acid to form tall oil, characterised in that the soap oil obtained in the neutralisation step is subjected to an intermediate treatment before the cooking step, the intermediate treatment comprising heating of the soap oil to release gases dissolved in and bound to the soap oil.

2. A method as claimed in claim 1, characterised in that the intermediate treatment comprises heating of the soap oil at a temperature of 60 to 100° C. for 5 minutes or more.

3. A method as claimed in claim 1, characterised in that the intermediate treatment comprises heating of the soap oil at a temperature of 90 to 98° C. for 5–30 minutes.

4. A method as claimed in claim 1, characterised in that the neutralisation step comprises neutralisation of the soap with an acidly reacting substance selected in the group consisting of carbon dioxide, bisulphite, sulphur dioxide and carboxylic acid.

5. A method as claimed in claim 1, characterised in that the neutralisation step comprises neutralisation of the soap first with carbon dioxide and then with a second acidly reacting substance selected in the group consisting of bisulphite, sulphur dioxide, sulphuric acid, hydrochloric acid, nitric acid and carboxylic acid.

6. A method for preparing tall oil comprising:
a neutralisation step, in which the soap is neutralised to form soap oil, and a cooking step, in which the soap oil is cooked with sulphuric acid to form tall oil, characterised in that it further comprises an intermediate treatment, in which the soap oil obtained in the neutralisation step is heated before the cooking step to release gases dissolved in and bound to the soap oil, whereby the cook is facilitated and the phase separation subsequent to the cook is enhanced.

7. A method as claimed in claim 6, characterised in that the intermediate treatment comprises heating of the soap oil at a temperature of 60 to 100° C. for 5 minutes or more.

8. A method as claimed in claim 6, characterised in that the intermediate treatment comprises heating of the soap oil at a temperature from 90 to 98° C. for 5 to 30 minutes.

9. A method as claimed in claim 6, characterised in that the neutralisation step comprises neutralisation of the soap with an acidly reacting substance selected in the group consisting of carbon dioxide, bisulphite, sulphur dioxide and carboxylic acid.

10. A method as claimed in claim 6, characterised in that the neutralisation step comprises neutralisation of the soap first with carbon dioxide and then with a second acidly reacting substance selected in the group consisting of bisulphite, sulphur dioxide, sulphuric acid, hydrochloric acid, nitric acid and carboxylic acid.

11. A method as claimed in claim 2, characterised in that the intermediate treatment comprises heating of the soap oil at a temperature of 90 to 98° C. for 5–30 minutes.

12. A method as claimed in claim 2, characterised in that the neutralisation step comprises neutralisation of the soap with an acidly reacting substance selected in the group consisting of carbon dioxide, bisulphite, sulphur dioxide and carboxylic acid.

13. A method as claimed in claim 3, characterised in that the neutralisation step comprises neutralisation of the soap with an acidly reacting substance selected in the group consisting of carbon dioxide, bisulphite, sulphur dioxide and carboxylic acid.

14. A method as claimed in claim 11, characterised in that the neutralisation step comprises neutralisation of the soap with an acidly reacting substance selected in the group consisting of carbon dioxide, bisulphite, sulphur dioxide and carboxylic acid.

15. A method as claimed in claim 2, characterised in that the neutralisation step comprises neutralisation of the soap first with carbon dioxide and then with a second acidly reacting substance selected in the group consisting of bisulphite, sulphur dioxide, sulphuric acid, hydrochloric acid, nitric acid and carboxylic acid.

16. A method as claimed in claim 3, characterised in that the neutralisation step comprises neutralisation of the soap first with carbon dioxide and then with a second acidly reacting substance selected in the group consisting of bisulphite, sulphur dioxide, sulphuric acid, hydrochloric acid, nitric acid and carboxylic acid.

17. A method as claimed in claim 4, characterised in that the neutralisation step comprises neutralisation of the soap first with carbon dioxide and then with a second acidly reacting substance selected in the group consisting of bisulphite, sulphur dioxide, sulphuric acid, hydrochloric acid, nitric acid and carboxylic acid.

18. A method as claimed in claim 11, characterised in that the neutralisation step comprises neutralisation of the soap first with carbon dioxide and then with a second acidly reacting substance selected in the group consisting of bisulphite, sulphur dioxide, sulphuric acid, hydrochloric acid, nitric acid and carboxylic acid.

19. A method as claimed in claim 7, characterised in that the intermediate treatment comprises heating of the soap oil at a temperature from 90 to 98° C. for 5 to 30 minutes.

20. A method as claimed in claim 7, characterised in that the neutralisation step comprises neutralisation of the soap with an acidly reacting substance selected in the group consisting of carbon dioxide, bisulphite, sulphur dioxide and carboxylic acid.

21. A method as claimed in claim 8, characterised in that the neutralisation step comprises neutralisation of the soap with an acidly reacting substance selected in the group consisting of carbon dioxide, bisulphite, sulphur dioxide and carboxylic acid.

22. A method as claimed in claim 7, characterised in that the neutralisation step comprises neutralisation of the soap first with carbon dioxide and then with a second acidly reacting substance selected in the group consisting of bisulphite sulphur dioxide, sulphuric acid, hydrochloric acid, nitric acid and carboxylic acid.

23. A method as claimed in claim 8, characterised in that the neutralisation step comprises neutralisation of the soap first with carbon dioxide and then with a second acidly reacting substance selected in the group consisting of bisulphite sulphur dioxide, sulphuric acid, hydrochloric acid, nitric acid and carboxylic acid.

24. A method as claimed in claim 9, characterised in that the neutralisation step comprises neutralisation of the soap first with carbon dioxide and then with a second acidly reacting substance selected in the group consisting of bisulphite sulphur dioxide, sulphuric acid, hydrochloric acid, nitric acid and carboxylic acid.

* * * * *